United States Patent [19]

Katoh

[11] Patent Number: 4,802,993
[45] Date of Patent: Feb. 7, 1989

[54] METHOD OF TREATING LIQUID WASTES CONTAINING HEAVY METAL CHELATE COMPOUNDS

[75] Inventor: Seiji Katoh, Yokosuka, Japan

[73] Assignee: Hitachi, Ltd., Tokyo, Japan

[21] Appl. No.: 64,562

[22] Filed: Jun. 22, 1987

Related U.S. Application Data

[63] Continuation of Ser. No. 754,448, Jul. 12, 1985, abandoned.

[30] Foreign Application Priority Data

Jul. 13, 1984 [JP] Japan ............................ 59-144249
Jul. 13, 1984 [JP] Japan ............................ 59-144250
Jul. 13, 1984 [JP] Japan ............................ 59-144251

[51] Int. Cl.$^4$ .................................... C02F 1/56
[52] U.S. Cl. ............................ 210/725; 210/727; 210/734; 210/912; 423/34
[58] Field of Search ........ 210/702, 716, 717, 724–728, 210/912, 913, 734; 423/34, 36, 140, 146

[56] References Cited

U.S. PATENT DOCUMENTS

| | | | |
|---|---|---|---|
| 3,497,459 | 2/1970 | Nakamura et al. | 210/702 |
| 3,544,476 | 12/1970 | Aiba et al. | 210/702 |
| 4,172,785 | 10/1979 | Knorre et al. | 210/912 |
| 4,260,491 | 4/1981 | Cassidy et al. | 210/913 |
| 4,512,900 | 4/1985 | Macur et al. | 210/912 |
| 4,624,790 | 11/1986 | Kamperman et al. | 210/912 |
| 4,629,570 | 12/1986 | Kennedy, Jr. | 210/912 |

FOREIGN PATENT DOCUMENTS

| | | | |
|---|---|---|---|
| 51-10176 | 1/1976 | Japan | 210/912 |
| 57-25280 | 5/1982 | Japan | |
| 60-96765 | 5/1985 | Japan | 210/702 |

OTHER PUBLICATIONS

*Chemical Abstracts* vol. 82, No. 4, 1-27-75, p. 316, 21429e.

*Chemical Abstracts* vol. 89, No. 4, 7-24-78, p. 377, 30387m.

*Chemical Abstracts*, vol. 87, No. 18, 10-31-77, p. 296, 140824t.

*Primary Examiner*—Peter Hruskoci
*Attorney, Agent, or Firm*—Antonelli, Terry & Wands

[57] ABSTRACT

A method of treating liquid wastes containing heavy metal chelate compounds which comprises reducing the pH of liquid wastes containing the heavey metal chelate compounds to 4 or less, adding iron polysulfate or at least one heavy metal ion selected from a source of $Fe^{++}$, $Fe^{+++}$, $Cu^{++}$, $Ni^{++}$ and $Zn^{++}$ other than the iron polysulfate to form an iron chelate compound, then forming a solution containing $Ca^{++}$ ions at pH 9 or more, and flocculating to precipitate thereby separating the resulting heavy metal hydroxides. The method gives a high heavy metal and COD removal rates, as well as showing good separability for flocks upon flocculating treatment.

6 Claims, 1 Drawing Sheet

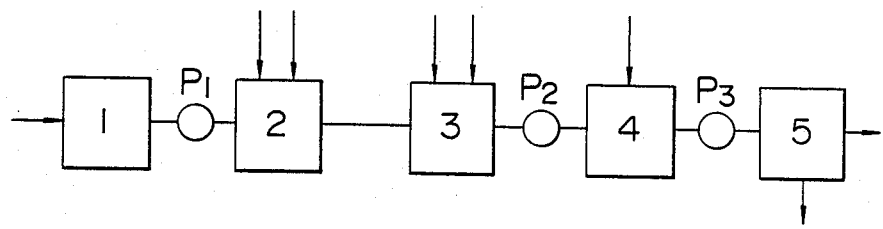

METHOD OF TREATING LIQUID WASTES CONTAINING HEAVY METAL CHELATE COMPOUNDS

This is a continuation of application Ser. No. 754,448, filed July 12, 1985, now abandoned.

BACKGROUND OF THE INVENTION

This invention relates to a method of treating liquid wastes containing heavy metal chelate compounds.

Since liquid wastes discharged from plants for manufacturing printed circuit boards or the like contain heavy metal chelates such as Cu-EDTA derived from chemical copper plating solutions, if the liquid wastes are discharged as they are into rivers or other water bodies, they may cause circumstantial pollution. Various methods of treating these liquid wastes have hitherto been put to practical use. For example, there have been known relatively effective treating methods such as an excess calcium hydroxide addition method of adding calcium hydroxide to liquid wastes containing Cu-EDTA chelates to adjust pH to 12 or more and then adding a flocculant thereby causing flocculating precipitation, an oxidative separation method of treating Cu-EDTA by using a powerful oxidizer and an adsorption method of treating Cu-EDTA by means of ion exchange resins or the like.

Heavy metals in the liquid wastes can be removed more or less by these treating methods. However, the excess calcium hydroxide addition method requires much chemical cost and, in addition, causes scalings to pumps and pipeways and cloggings in the filter. The oxidative decomposition method requires a longer processing time to attain a sufficient removal rate even when the solution is warmed. The adsorption method requires a high regeneration of ion exchange resins or the like and no effective improvement can be expected for the Cu-removal rate (refer to Patent KOKUKU (Post-Exam Publn) No. 25280/1982).

SUMMARY OF THE INVENTION

The object of this invention is to provide a method of treating liquid wastes containing heavy metal chelate compounds giving high heavy metal and COD removal rates, as well as showing good separability for flocks upon flocculating treatment.

BRIEF DESCRIPTION OF THE DRAWINGS

The drawing is a flow chart of one embodiment for carrying out this invention, wherein are shown a liquid wastes store tank 1, a first treating tank 2, a second treating tank 3, a thickener 4, a dehydrator 5 and pumps P1-P4.

DETAILED DESCRIPTION OF THE PREFERRED EMBODIMENTS

The foregoing object of this invention can be attained by the process which comprises adjusting the pH of the liquid wastes containing heavy metal chelate compounds to 4 or less and, preferably, from 2 to 4, adding an iron polysulfate $[Fe(OH)_n(SO_4)_{(3-n)/2}]_m$ (where $n<2$, $m>10$) to form an iron chelate compound, then preparing a solution containing $Ca^{++}$ ions at a pH 9 or more, preferably, between 9–10, flocculating to precipitate the resulting heavy metal hydroxide with a flocculant and then separating them. It can also be attained by the process which comprises adjusting the pH of liquid wastes containing heavy metal chelate compounds to 4 or less, preferably, between 2–4 and, most preferably, between 2–3, adding at least one heavy metal ion ($\alpha>4$) selected from the group consisting of $Fe^{++}$, $Fe^{+++}$, $Cu^{++}$, $Ni^{++}$, $Zn^{++}$ and $Ca^{++}$ ions simultaneously or successively (there is no particular restriction for the order in the case of the successive addition) to form chelates of these heavy metal ions, then adjusting pH to 9 or more and, preferably, from 9 to 10, flocculating to precipitate the resulting heavy metal hydroxides by using a flocculant and then separating them.

The iron polysulfate represented by the above formula:

$[Fe(OH)_n(SO_4)_{(3-n)/2}]_m$ (where $n<2$, $m>10$) is manufactured and sold from Nittetsu Kogyo K.K. and has the composition, for example, as shown in Table 1.

TABLE 1

| Item | Concentration |
|---|---|
| $Fe^{+++}$ | 160.6 g/l |
| $Fe^{++}$ | 0.84 g/l |
| $SO_4^{--}$ | 377.0 g/l |
| Cd | less than 0.01 mg/l |
| Pb | 1.40 g/l |
| Hg | less than 0.005 mg/l |
| As | less than 0.01 mg/l |
| Specific gravity | 1.464 |

Further, $Fe^{++}$, $Fe^{+++}$, $Cu^{++}$, $Ni^{++}$ and, $Zn^{++}$, are available, for example, from a solution and a solid of ferrous sulfate, ferric sulfate, ferrous chloride, ferric chloride, copper sulfate, nickel sulfate, nickel chloride and zinc chloride, and sludges containing the above-mentioned heavy metal ions and calcium ions.

The amount of these compounds added is equal to or more than 4 times, preferably 4 to 10 times, as converted into metal, as large as all chelating equivalents contained in chemical copper plating waste solutions containing copper chelate compounds and chelating agents. The equivalent ratio of heavy metal ions to chelating agents is at least 1.5:1.

$Ca^{++}$ ions are supplied by dissolving one selected from the group consisting of $Ca(OH)_2$, CaO and $CaCO_3$, the pH of which is adjusted to 9 or more. Further, NaOH, $Na_2CO_3$ and MgO may also be used together. If the pH value is less than 9, chelates of heavy metals other than copper may remain or copper chelate is formed again to reduce the heavy metal and COD removal rates.

For adjusting pH to 4 or less, while sulfuric acid is usually employed, hydrochloric acid may also be used. If pH is greater than 4, heavy metal chelates may remain and no desirable precipitations can be separated even with the addition of the flocculant to reduce the heavy metal removal rate.

As the flocculant, while polyacrylamide type anionic polymeric flocculants are preferred, cationic or nonionic polymeric flocculants may also be used. Further, inorganic flocculant such as polyaluminum chloride may be used as well. The amount of the flocculant added is from 0.5 to 10 ppm and, preferably, from 1 to 2 ppm. Usually, the flocculant is added in the form of an aqueous 0.05–0.2% solution after the addition. Then, liquid wastes are stirred, left for about 2–10 minutes and concentrated by a thickener or the like from which slurries are separated to be removed by an Oliver type vacuum dehydrator or the like.

The polyacrylic amide type ionic polymeric flocculant is available, for example, as EDP-351 manufactured by Kurita Kogyo K.K. It has molecular weight of $900 \times 10^4$, bulk specific gravity of 0.75, effective pH range from 7 to 12 and pH value in an 0.1% aqueous solution of 8.3. The cationic polymeric flocculant can include Himolock MP-473H, Himolock MP-473L manufactured by Kyoritsu Yuki Kagaku Kogyo Institute.

This invention will now be described more specifically referring to examples.

EXAMPLE 1

To 10 m³ of chemical copper liquid wastes discharged from a printed circuit board manufacturing plant (containing 15 ppm Cu, 165 ppm EDTA and 80 ppm COD), a 5% sulfuric acid solution was added to adjust pH of the solution to 2.5. Then, 60 ppm (as converted into iron) of iron polysulfate (POLYTETSU, 11% ferric content; manufactured by Nittetsu Kogyo) was added to and mixed with the solution, the solution thereby having an equivalent ratio of heavy metal ions to EDTA of 2.32:1. After stirring for 3 minutes, 10% calcium hydroxide was added to adjust pH to 10. Further, an anionic polyacrylic amide flocculant (KURIFLOCK EDP351: manufactured by Kurita Kogyo) was added in an amount of 1 ppm to the solution. After leaving for 5 minutes, precipitated slurry-like solids were separated by an Oliver type vacuum dehydrator.

The contents for copper and iron in the resultant supernatant were determined to obtain the results as shown in Table 2.

TABLE 2

|  | Cu | Fe | COD |
|---|---|---|---|
| Content (ppm) | 0.22 | less than 0.01 | 12 |
| Removal rate (%) | 98.5 | 100 | 85 |

EXAMPLE 2

The same procedures as in Example 1 were repeated except for varying the concentration of the chemical copper liquid wastes and the addition amount of the iron polysulfate in the first treating step, and the pH value in the second treating step as shown in Table 3.

The contents for copper and iron in the treated water were determined to obtain the results as shown in Table 3.

TABLE 3

Thus, the equivalent ratio of heavy metal ions to EDTA after addition of 100 ppm and 200 ppm of iron polysulfate was 9.43:1 and 16.89:1, respectively.

| Concentration of chemical copper liquid wastes (ppm) | | Concentration iron polysulfate (ppm) | PH | Heavy metal concentration in treated water | |
|---|---|---|---|---|---|
| Cu | EDTA | | | Cu | Fe |
| 30 | 70 | 100 | 10 | 0.56 | 0.56 |
|  |  |  | 11 | 0.56 | 0.28 |
|  |  |  | 11.5 | 0.56 | ND |
|  |  |  | 12 | 0.56 | ND |
|  |  | 200 | 10 | 0.56 | 0.28 |
|  |  |  | 11 | 0.23 | ND |
|  |  |  | 11.5 | 0.23 | ND |
|  |  |  | 12 | 0.33 | ND |

EXAMPLE 3

The same procedures as in Example 1 were repeated except for varying the concentration of the chemical copper liquid wastes (Cu: 3,000 ppm, EDTA: 35,000 ppm, COD: 18,000 ppm) to 200 liters, the addition amount of the iron polysulfate to 45,000 ppm and the addition amount of the flocculant to 50 ppm. Thus, the equivalent ratio of heavy metal ions to EDTA after iron polysulfate addition was 6.81:1. The contents for copper and iron in the treated water were determined to obtain the results as shown in Table 4.

TABLE 4

|  | Cu | Fe | COD |
|---|---|---|---|
| Content (ppm) | 7.3 | 5.5 | 680 |
| Removal rate (%) | 99.8 | 100 | 96.2 |

COMPARATIVE EXAMPLE 1

The procedures in Example 1 were repeated without adding the iron polysulfate in the first treating step. The copper content in the solution was 10 ppm. In addition, the precipitating property of the flocks was poor in this treatment after the addition of the flocculant.

COMPARATIVE EXAMPLE 2

Iron polysulfate was added to the chemical copper liquid wastes with the solution pH as it was not reduced to 2.5 in the first treating step and pH was adjusted to 10 in the second treatment step in the same manner as in Example 1. The copper content was 10 ppm and the iron content was 25 ppm in the solution after the treatment. The color of the solution after adding the flocculant in this treatment was yellowish blue.

EXAMPLE 4

To 10 m³ of chemical copper liquid wastes discharged from a printed circuit board manufacturing plant (Cu: 15 ppm, EDTA: 165 ppm, COD: 142 ppm), 5% sulfuric acid solution was added to adjust pH to 2.5. Then, 0.5 m³ sludges, 5% to the liquid wastes water (water content: 98%, Cu: 1240 ppm, Fe: 620 ppm, Ca: 15,000 ppm) was added and mixed to adjust pH to 2.5 again. Thus, the equivalent ratio of heavy metal ions to EDTA was 3.13:1. After stirring for 3 minutes, 10% calcium hydroxide was added to adjust pH to 10. Further, an anionic polyacrylic amide flocculant (KURIFLOCK EDP351: manufactured by Kurita Kogyo) was added in an amount of 2 ppm to the solution. After leaving for 5 minutes, precipitated slurry-like solids were separated by an Oliver type vacuum dehydrator.

The contents for copper and iron in the obtained supernatant were determined to obtain the results as shown in Table 5.

TABLE 5

|  | Cu | Fe | COD |
|---|---|---|---|
| Content (ppm) | 0.33 | less than 0.01 | 28 |
| Removal rate (%) | 97.8 | — | 80.3 |

EXAMPLE 5

The same procedures as in Example 4 were repeated except for varying the sludges used in the first treatment step (water content 98%, Cu: 370 ppm, Fe: 280 ppm, Ni: 60 ppm, Zn: 160 ppm, Cr: 15 ppm, Ca: 14,000 ppm) from those shown in Table 5. Thus, the equivalent ratio of heavy metal ions to EDTA was 1.71:1. The contents for copper, nickel and COD in the supernatant obtained in this treatment were determined to obtain the results as shown in Table 6.

TABLE 6

|  | Cu | Ni | COD |
|---|---|---|---|
| Content (ppm) | 0.26 | 0.11 | 12 |
| Removal rate (%) | 98.3 | — | 75.4 |

EXAMPLE 6

The same procedures as in Example 4 were repeated except for usng 2 ppm of the flocculant in the second treatment step and adding 2% (0.2 m³) of sludges together with the flocculant to the solution. Thus, the equivalent ratio of heavy metal ions to EDTA was 1.50:1. The contents for copper, iron and COD in the supernatant obtained in this treatment were determined to obtain the results shown in Table 7.

TABLE 7

|  | Cu | Fe | COD |
|---|---|---|---|
| Content (ppm) | 0.23 | less than 0.01 | 13 |
| Removal rate (%) | 98.5 | — | 90.8 |

COMPARATIVE EXAMPLE 3

The procedures in Example 4 were repeated without adding the sludges in the first treating step. The content was 10 ppm for copper and 107 ppm for COD in the solution. In addition, the precipitating property of the flocks was poor in this treatment after the addition of the flocculant.

COMPARATIVE EXAMPLE 4

Sludges were added to the chemical copper liquid wastes with the solution pH as it was not reduced to 2.5 in the first treating step and pH was adjusted to 10 in the second treatment step in the same manner as in Example 1. The content in the solution was 2.2 ppm for copper, 0.5 ppm for iron and 650 ppm for COD. The removal rate was inferior to that in Example 4.

EXAMPLE 7

To 10 m³ of chemical copper liquid wastes discharged from a printed circuit board manufacturing plant (containing Cu: 15 ppm, EDTA: 165 ppm and COD: 142 ppm), sulfuric acid was added to adjust pH to 2.5. Then, ferrous sulfate (containing 10% ferrous content) was added and mixed with the solution so as to provide 200 ppm of $Fe^{++}$. Thus, the equivalent ratio of heavy metal ions to EDTA was 6.76:1. After stirring for 3 minutes, 10% calcium hydroxide was added to adjust pH to 11. Further, an anionic polyacrylic amide flocculant (KURIFLOCK EDP351: manufactured by Kurita Kogyo) was added in an amount of 1 ppm to the solution. After leaving for 5 minutes, precipitated slurry-like solids were separated by an Oliver type vacuum dehydrator.

The contents for copper, iron and COD in the obtained supernatant were determined to obtain the results as shown in Table 8.

TABLE 8

|  | Cu | Fe | COD |
|---|---|---|---|
| Content (ppm) | 1.22 | 25.3 | 5.6 |
| Removal rate (%) | 91.8 | — | 60.6 |

EXAMPLE 8

The same procedures as in Example 4 were repeated except for replacing the heavy metal-containing salts used in the first treatment step with a mixed solution of copper sulfate and nickel sulfarte (Cu: 50 ppm, Ni: 50 ppm). Thus, the equivalent ratio of heavy metal ions to EDTA was 3.32:1. The contents for copper, nickel and COD in the supernatant obtained in this treatment were determined to obtain the results as shown in Table 9.

TABLE 9

|  | Cu | Ni | COD |
|---|---|---|---|
| Content (ppm) | 1.65 | 5.91 | 6.6 |
| Removal rate (%) | 89.0 | — | 53.4 |

EXAMPLE 9

The same procedures as in Example 7 were repeated except for using 200 liters of chemical copper liquid wastes (Cu: 3,000 ppm, EDTA: 35,000 ppm and COD 28,500 ppm) and 100 liter of ferric chloride etching liquid wastes (Fe: 140,000 ppm, Cu: 50,000 ppm) and adding 50 ppm of the flocculant. Thus, the equivalent ratio of heavy metal ions to EDTA was 14.15:1. The contents for copper, iron and COD in the supernatant of the treated water were determined to obtain the results as shown in Table 10.

TABLE 10

|  | Cu | Fe | COD |
|---|---|---|---|
| Content (ppm) | 28 | 103 | 4,400 |
| Removal rate (%) | 99.1 | — | 84.6 |

COMPARATIVE EXAMPLE 5

The same procedures as in Example 7 were repeated without adding heavy metal-containing salts in the first treatment step. The copper concentration in the supernantant was 6.5 ppm. Less flocks were formed in this treatment after the addition of the flocculant, and the precipitating property was poor.

COMPARATIVE EXAMPLE 6

The same procedures as in Example 7 were repeated except for adding heavy metal-containing salts to the chemical copper liquid wastes with the pH solution as it was not reduced to 2.5. The copper content in the supernatant was 4.1 ppm and the flock precipitating property was poor like that in Comparative Example 2.

These examples are some embodiments of this invention and do not restrict the scope of the invention.

According to the invention, it can be applied to treatment of liquid wastes containing other heavy metal such as, for example, nickel, zinc and cadmium, as well as liquid wastes containing copper chelate compounds.

Furthermore, as chelating agents, polyaminocarboxylic acid such as DTPA, NTA, DTA or the like, and amine can be used.

What is claimed is:

1. A method of treating aqueous plant waste containing copper chelate compounds and chelating agents which comprises the steps of:
   reducing the pH of the waste to 4 or less;
   adding heavy metal ions of at least one member selected from the group consisting of $Fe^{++}$, $Fe^{+++}$, $Cu^{++}$, $Ni^+$ and $Zn^{++}$ simultaneously or successively to said waste having the reduced pH, the amount of heavy metal ions added as compounds being such that the equivalent ratio of heavy metal ions to chelating agents contained in said aqueous plant waste is at least 1.5:1, wherein the $Fe^{++}$, $Fe^{++}$ and $Cu^{++}$ ions are obtained by the addition of ferrous sulfate, ferric sulfate and copper sulfate, respectively; the $Ni^{++}$ and $Zn^{++}$ ions are obtained by the addition of nickel sulfate or nickel chloride and zinc chloride, respectively; or the heavy metal ions are added as sludges containing heavy metal ions and $Ca^{++}$ adjusting the pH of the treated waste by adding a solution containing $Ca^{++}$ ions to provide a pH of 9 or more and to produce copper hydroxide;

adding an anionic polyacrylamide flocculant to precipitate the copper hydroxide; and separating the thus-produced hydroxide from the thus-treated aqueous plant waste.

2. A method of treating aqueous plant waste containing copper chelate compounds and chelating agents as defined in claim 1, wherein said flocculant is added in an amount of from 0.5 to 10 ppm.

3. A method of treating aqueous plant waste containing copper chelate compounds and chelating agents as defined in claim 1, wherein said pH is adjusted to 10-12 by the step of adjusting the pH of the treated waste.

4. A method of treating aqueous plant waste containing copper chelate compounds and chelating agents which comprises the steps of:

reducing the pH of the waste to 4 or less;

adding iron polysulfate of the formula:

$[Fe(OH)_n(SO_4)_{(3-n)/2}]_m$ where $n<2$, $m>10$, the amount of iron polysulfate added as compound being such that the equivalent ratio of copper and iron ions to chelating agents contained in said aqueous plant waste is at least 1.5:1;

adjusting the pH of the treated waste by adding a solution containing $Ca^{++}$ ions to provide a pH of 9 or more and to produce copper hydroxide;

adding an anionic flocculant polyacrylamide to precipitate the copper hydroxide; and separating the thus-produced hydroxide from the thus-treated aqueous plant waste.

5. A method of treating aqueous plant waste containing copper chelate compounds and chelating agents as defined in claim 4, wherein said flocculant is added in an amount of from 0.5 to 10 ppm.

6. A method of treating aqueous plant waste containing copper chelate compounds and chelating agents as defined in claim 4, wherein said pH is adjusted to 10-12 by the step of adjusting the pH of the treated waste.

* * * * *